United States Patent [19]

Henkel et al.

[11] Patent Number: 4,623,755

[45] Date of Patent: Nov. 18, 1986

[54] ELECTRICAL INSULATION

[75] Inventors: Hans-Joachim Henkel; Norbert Müller, both of Erlangen, Fed. Rep. of Germany

[73] Assignee: Siemens Aktiengesellschaft, Munich, Fed. Rep. of Germany

[21] Appl. No.: 775,705

[22] Filed: Sep. 13, 1985

Related U.S. Application Data

[63] Continuation of Ser. No. 613,642, May 24, 1984, abandoned.

[30] Foreign Application Priority Data

May 25, 1983 [DE] Fed. Rep. of Germany ....... 3318988

[51] Int. Cl.$^4$ ................................................ H01B 7/00
[52] U.S. Cl. ....................... 174/110 SR; 174/110 PM; 252/506; 252/507; 252/511; 524/586
[58] Field of Search ................... 174/110 SR, 110 PM, 174/120 SR; 252/511, 506, 507; 524/586

[56] References Cited

U.S. PATENT DOCUMENTS

| | | | |
|---|---|---|---|
| 3,028,355 | 4/1962 | Toy et al. | 524/586 |
| 4,144,202 | 3/1979 | Ashcroft | 252/63.2 |
| 4,212,756 | 7/1980 | Ashcraft | 252/63.2 |
| 4,263,158 | 4/1981 | Ashcraft | 252/573 |
| 4,282,333 | 8/1981 | Irie | 525/6 |

FOREIGN PATENT DOCUMENTS

| | | | |
|---|---|---|---|
| 0027300 | 4/1981 | European Pat. Off. | |
| 2425760 | 1/1975 | Fed. Rep. of Germany. | |
| 2523844 | 12/1976 | Fed. Rep. of Germany. | |
| 2537283 | 3/1977 | Fed. Rep. of Germany. | |
| 2817801 | 9/1978 | Fed. Rep. of Germany. | |
| 2754336 | 7/1979 | Fed. Rep. of Germany. | |
| 2805875 | 8/1979 | Fed. Rep. of Germany. | |
| 2806752 | 8/1979 | Fed. Rep. of Germany. | |
| 2911756 | 10/1980 | Fed. Rep. of Germany. | |
| 2935224 | 3/1981 | Fed. Rep. of Germany. | |
| 2213954 | 8/1974 | France | 524/584 |
| 729669 | 5/1955 | United Kingdom | 524/586 |
| 808286 | 2/1959 | United Kingdom | 524/586 |
| 822498 | 10/1959 | United Kingdom | 524/586 |
| 1443461 | 7/1976 | United Kingdom | 524/586 |

OTHER PUBLICATIONS von Wanswer et al., Kabelisolierungen aus Kunststoff, Kunststoffe 71 (1981) pp. 448-453.

*Primary Examiner*—Joseph L. Schofer
*Assistant Examiner*—N. Sarofim
*Attorney, Agent, or Firm*—Kenyon & Kenyon

[57] ABSTRACT

The invention relates to an electrical insulation composition of a polyolefin, which can be used for medium and high voltage from about 10 kV and which resists effectively and permanently the formation of so-called water trees. The insulative polyolefin contains an inorganic oxide additive, in homogeneous distribution therewith, at a concentration of 0.05 to 10% by weight, relative to the total weight of the composition. The additive is absorption-active for heavy metal ions and/or binds heavy metal ions in an ion exchange, with a particle size of up to 50 um or an agglomerate size of up to 100 um. It can be silica, alumina, hydrated alumina or an aluminum silicate. The electrical insulation according to the invention is particularly well-suited for use in cables and wires.

7 Claims, No Drawings

ELECTRICAL INSULATION

This application is a continuation of application Ser. No. 613,642 filed May 24, 1984, now abandoned.

BACKGROUND OF THE INVENTION

The invention relates to polyolefin electrical insulation having an additive for retarding water trees which is useful for cables and wires carrying medium and high voltage such as about 10 kV or higher.

In electrically stressed polyolefin insulation, processes can occur which are called "electrochemical treeing" (ECT) or "water treeing". These processes, which are of importance especially in view of the operating safety of plastic-insulated medium and high-voltage cables, lead to the development of branching or tree-like structures, the so-called ECT structures.

The appearance of ECT structures which are visible with particular contrast and detail after suitable staining, varies greatly. In principle, two forms are distinguished:

(a) "vented trees" which start from the surface of the insulation and extend into the insulation, and (b) "bow-tie trees" which are generated in the interior of the insulation.

The mechanism of ECT development has not yet been clarified. However, it is generally assumed that an electric field and the presence of a polar liquid, especially water, are required for the formation of ECT structures; the ECT structures are therefore also called water trees. The points of initiation of the water trees always seem to be faults in the insulation such as impurities, aggregated admixtures, voids, gaps, cracks or boundary surfaces. These faults however, only partly lead to the formation of water trees. From the faults, which in mass-produced insulation cannot be avoided completely, the tree-like structures extend in the direction of the electric field.

Since ECT structures represent local changes of the insulating material, they can cause damage to the insulation, especially with respect to its dielectric strength. Numerous attempts have therefore already been undertaken to prevent or at least retard the growth of water trees.

One of the measures to prevent the formation of water trees is to provide the insulating layer with a metallic envelope or jacket, for example, of lead or aluminum. Cables with such a water shielding layer, however, are not only more expensive but are also heavier and therefore more difficult to handle than cables without metal jackets.

For this reason it has been attempted to prevent the formation of ECT structures by additives to the insulating layer (or adjacent layers). From the numerous compounds used for this purpose, the following are mentioned as examples: lead stearate (DE-OS No. 24 25 760 or British Pat. No. 1,473,867), sodium chloride and sulfate or other strong electrolytes (DE-AS No. 25 37 283 or U.S. Pat. No. 4,042,776), salts forming stable hydrates such as calcium and magnesium chloride, and basic anhydrides (DE-OS No. 28 17 804 or British Pat. No. 1,584,501), silica gel and phosphous pentoxide (DE-OS No. 27 54 336: page 6, last paragraph), organosilanes (U.S. Pat. Nos. 4,144,202; 4,212,756 and 4,263,158 as well as DE-OS No. 28 05 875: page 3, paragraphs 2 and 3), lead oxides and basic lead compounds (DE-OS No. 25 23 844: claim 1, and DE-OS No. 28 06 752: claims 1 and 3), organic isocyanates (U.S. Pat. No. 4,282,333), silane compounds grafted on to the polymer material (DE-OS No. 29 35 224; claim 1) and metal complexes of diketones, salicylic acid or Schiff bases (European Pat. No. A1-27 300).

On the other hand and contrary to the proposal to add salt-like compounds or electrolytes, it has been proposed to keep the content of water-soluble and/or hygroscopic salts finely distributed in the insulation below a value of $10^{-1}$ ppm and preferably under $10^{-4}$ ppm (DE-OS No. 29 11 756: page 3, paragraphs 3 and 4).

However, all these measures, which are in part contradictory, have not yet led to the desired success. It is recommended in a report on CIGRE, the International High-Voltage Conference of 1980, (see: "Kunststoffe" 71, 1981, pages 448 sff, particularly on page 450 to page 451), that a water-tight metal shield should be applied to (high-voltage) cables in order to prevent moisture from penetrating.

It is therefore, an object of the invention to suppress effectively and permanently in electrical insulation composed of cross-linked and/or linear polyolefins, the growth of water trees or to prevent their substantial formation through the use of additives so that expensive measures such as metal jackets need not be used.

SUMMARY OF THE INVENTION

According to the invention, these and other objects are achieved by a composition of a polyolefin electrical insulation material containing an inorganic oxide additive in homogeneous distribution, within the polyolefin material, which additive content is 0.05 to 10% by weight relative to the total weight of the composition. The inorganic oxide additive is absorption-active for heavy metal ions or binds heavy metal ions in an ion exchange fashion. It has a particle size up to 50 um or an agglomerate size up to 100 um. The additives may be present in the electrical insulation individually or in the form of mixtures.

Within the context of the present patent application, "homogeneous distribution" is understood to mean that no special measures for influencing the distribution obtained in the processing are necessary or taken.

The inorganic oxide additive may be a silica, an aluminum oxide or hydrate thereof or an aluminum silicate.

Preferably, pyrogenic and/or precipitated silica is the additive of the electrical insulations according to the invention. Aluminum oxides and aluminum oxide hydrates with a large active surface and/or aluminum silicates can also advantageously be used as additives. The additives are preferably synthetic products. Minerals found in nature can also used and particularly if they meet requirements as to purity and uniformity of the particle size; the minerals should contain as little dross and trace impurities as possible. Generally, the additives should be as pure as possible.

DETAILED DESCRIPTION OF THE INVENTION

The silicas used in the electrical insulation according to the invention are preferably synthetic products which are present in highly dispersed, i.e., finely distributed form. These silica compounds (chemical composition: $SiO_2 \cdot x\, H_2O$) are also characterized by the fact that they are not crystalline but X-ray-amorphous. Synthetic silica is in general produced by pyrogenic methods or by wet processes. Pyrogenic silica is produced, for example, in the hydrolysis of silicon tetrachloride in an oxygen-hydrogen flame (temperature: about 1,000° C.). Precipitated silica (or precipitation silica) is produced from sodium silicate solutions by the addition of acids such as hydrochloric or sulfuric acid; the precipitate is washed, dried, heated to 300° to 800° C. and preferably to 400° to 700° C., and is subsequently milled.

The aluminum oxide and aluminum oxide hydrates used in the electrical insulation according to the invention can be in the form of minerals found in nature, such as ALO (OH) or $Al_2O_3.H_2O$. However, the oxides and oxide hydrates can also be synthesized according to known methods. To this end, oxide hydrates are precipitated, for example, from aluminum sulfate solutions by means of ammonia, dried and subsequently heated to temperatures of 400° to 750° C., and preferably to 500° to 00° C., and then milled.

The aluminum silicates used according to the invention can also be in the form of (purified) natural mineral products such as kaolinite $Al_4(OH)_8[Si_4O_{10}]$ or $Al_2O_3.2SiO_2.2H_2O$, montmorillonite $Al_2(OH)_2[Si_4O_{10}]$ or $Al_2O_3.4SiO_2.H_2O$ and bentonite, a clay mineral with montmorillonite as the main component. However, the aluminum silicates can also be precipitated from solutions by known methods; after drying, they are then heated to 350° to 950° C. and preferably to 450° to 700° C., and subsequently milled.

Using the additives according to the invention, the ECT formation in electrical insulating materials can be suppressed and the range of effective additives thus enlarged. These additives include barbituric acid or 2-thiobarbituric acid and derivatives thereof (German Offenlegungsschrift No. 32 02 828 or U.S. patent application Ser. No. 461,554, filed Jan. 27, 1983 now U.S. Pat. No. 4,458,044,) as well as of water-soluble alkali or earth alkali phosphates and hydrolizable phosphoric acid esters (German Offenlegungsschrift No. 32 02 896 or U.S. patent application Ser. No. 461,553, filed Jan. 27, 1983, now abandoned).

According to DE-OS No. 27 54 336, a high-voltage cable with a conductor insulation of plastic, particularly of a polyolefin is known, in which a diffusion gradient exists in the plastic insulation from the inside out. This measure is said to prevent somewhat the formation and the growth of water trees in the extruded conductor insulation. For generating a diffusion gradient in the conductor insulation, a number of possibilities are described. These include covering the conductor insulation with a layer of water-absorbing material or a material with a high loss factor, placing a water-absorbing substance into the insulation with a concentration increasing from the inside out (silica gel and phosphorus pentoxide are mentioned as such substitutes), heating of the conductor or the outer shield surrounding the conductor insulation and conducting a dry gas stream between the conductor insulation and the outer jacket. Advantageously, several of these measures are to be applied simultaneously. Nothing is said with regard to the concentration and the particle size of the silica gel and phosphorus pentoxide; apart from this, the use of such water-absorbing substances does not provide a permanent solution of the problem.

However, all of the measures mentioned are very cumbersome; this also applies to the generation of a concentration gradient in the insulating layer. It is therefore more than suprising and cannot be predicted that it is, for instance, sufficient, for producing a high effectiveness against ECT formation to use pyrogenic or precipitated silica as an additive and to distribute this additive in the insulating material homogeneously. This applies also with respect to the also already mentioned DE-OS No. 28 05 875. It is known therefrom to add to extruded field-limiting layers of high voltage cables containing conductive carbon black particularly to the outer conductor layers, alkoxy silanes and absorption-active fillers in the form of surface-active carbon black, finely dispersed precipitated silica and/or synthetic silica. The important additive, however, is here the alkoxy silane which is hydrolyzed by the water penetrating into the cable, i.e., serves for chemically binding the penetrating water. For, the objective of the mentioned measures is lowering the moisture content in the insulation. In contrast thereto the present patent application utilzies the concept that metal ions present in the insulation promote the ECT process, the harmful content of metal ions being uniformly distributed in the insulation. These metal ions are bound by the additives according to the invention; moisture present in the insulation can then no longer cause ECT-formation.

Besides its use in cables and wires, the electrical insulations according to the invention can also be used in bushings and fittings. Generally, the polymer present in these insulating materials according to the invention will be polyolefins and specifically cross-linked or linear materials. In the insulations according to the invention, polyethylene (PE) and cross-linked polyethylene (VPE) are used. In addition, ethylene copolymers such as ethylene-propylene copolymers (EPR), ethylene-vinyl acetate copolymers (EVA) and ethylene alkylacrylate copolymers (for instance, ethylene ethylacrylate and butylacrylate copolymers), and ethylene-propylene-diene terpolymers and mixtures (blends) of these ethylene copolymers and terpolymers with polyolefins, particularly polyethylene and polypropylene can be used. As already mentioned, the polymers and polymer mixtures can be cross-linked as well as linear. The cross-linking can be accomplished by peroxide or by high-energy radiation techniques. The insulating material may optionally be provided also with oxidation stabilizers.

As already explained, the additive content is between 0.05 and 10% by weight relative to the total weight of the electrical insulation. Advantageously, the additive content is between 0.1 and 4% by weight and preferably 0.5 to 2% by weight. The concentration of the additives upward is limited by the provision that the dielectric loss factor should not increase noticeably. In addition the specifications according to IEC Publication 502 (1978 issue) must be met.

The additives are added to the insulating material. In cables and wires, however, the additives, in addition to being present in the insulating layer, can also be present in the field-limiting layers, i.e., the inner and/or outer conducting layer. The inner conducting layer thereby surrounds the electrical conductor, and the insulating layer is situated between the inner and the outer conducting layer.

In the electrical insulation according to the invention, the particle size of the additives is up to 50 um, and the agglomerate size up to 100 um. Agglomerates are understood here to be loose accretions of particles which can be divided, for instance, by shear forces to a greater or smaller extent. Advantageously, the particle size is up to 20 um. The additives can also be worked into the polyolefin together with so-called viscoid agents, a paste of the additive and a viscoid agent being preferred. The following agents are particularly suitable as viscoid agents: paraffins, paraffin alcohols and esters; hydrocarbons, i.e., nonpolar compounds, are preferred because of the preservation of the electrical properties.

The invention will be explained in greater detail with the aid of embodiment examples.

EXAMPLES

(a) pyrogenic silica

For demonstrating the reduction of the formation of water trees, sheets 3 mm thick with and without additive were made from high-purity unstabilized thermoplastic, low-density polyethylene (LDPE). For producing insulations according to the invention, pyrogenic silica in concentrations of 0.5 and 1% by weight with differently active surface which is commercially available under the name Aerosil ® was mixed homogeneously into part of the sheet material prior to pressing. The test pieces in sheet form were then stressed with 10 kV/50 Hz, where both surfaces were in direct contact with a 3-percent sodium chloride solution heated to 70° C. The duration of the stress was 130 hours.

The test results show that the sheet test specimens containing pyrogenic silica contain fewer or no ECT structures under the same test conditions as compared to the test pieces without added silica. Furthermore, a considerable difference in the size of the ECT structures is obtained. For, while the lengthwise extent of the ECT structures in the direction of the electric field is up to 1500 um in the test pieces without silica addition, the silica-containing test pieces exhibit ECT structures below 500 um.

In detail, the following is found:

| Additive | Length of the ECT structures | Relative number of ECT structures (relative to the comparison test) |
| --- | --- | --- |
| (Comparison test) | ≦1500 um | — |
| Aerosil 130 | ≦500 um | Smaller |
| Aerosil 200 | ≦300 um | Much smaller |
| Aerosil 300 | — | None |
| Aerosil 380 | — | None |

The pyrogenic silica listed above exhibit an increasing specific surface in the sequence given, measured in accordance with the BET method (Aerosil 130: 130±25 m$^2$ ... Aerosil 380: 380±30 m$^2$/g). It follows that in the electrical insulation according to the invention, the additives preferably have a large specific surface.

(b) precipitated silica

Results corresponding to those with pyrogenic silica are obtained also if precipitated silica is added (hydrophilic BET surface: 170 m$^2$/g). For, while sheet specimens without additives contain, as already explained, numerous ECT structures with a length up to 1500 um, specimens with an additive of precipitated silica (content: 0.5 to 1% by weight) have very few ECT structures with a length less than 100 um.

(c) comparative results with hydrophobic forms of silica

In the electrical insulation according to the invention, it is essential that the additives are hydrophilic as is the case, for instance, with the synthetic silica. This silica has SiOH groups at the surface. If these groups are substituted, for instance, by reaction with alkylchlorosilanes, partially or completely hydrophobic products are generated. Such a product is commercially available, for instance, under the designation Aerosil R972. If such silica is used as the additive to electrical insulation, as many ECT structures are found under the conditions given above as in specimens without additive, where however the length of the ECT structures is even greater: it is up to 2400 um.

A similar situation applies in the case of hydrophobic precipitated silica. Test pieces with such silica (BET surface: 100 m$^2$/g) show a number of ECT structures increased relative to the comparison test, and this with a greater length (up to 1900 um).

(d) alumina and aluminum silicate

Results corresponding to those with silica are also found with the addition of aluminum oxides or aluminum oxide hydrates and aluminum silicates (concentration: 0.1 to 1% by weight). Thus, test pieces with an addition of kaolinite or metakaolinite (BET surface: 70 m$^2$/g) exhibit few ECT structures with a length below 500 um, and test pieces with an addition of synthetic gamma —Al$_2$O$_3$ (BET surface: 220 m$^2$/g) have few ECT structures with a length under 300 um.

The results obtained with sheet specimens are confirmed by tests on cables. Thus, for instance, checking an experimental cable with an addition of 2% by weight Aerosil 300 to the insulation showed only isolated ECT structures (after a stress period of 2600 hours) with a length of up to 200 um, while an experimental cable without additive exhibited many ECT structures with a length of up 1000 um.

It is therefore shown that the ECT formation can be reduced considerably by the additives according the invention, and this already with small concentrations. This has the further advantage that the electrical properties of the insulation are not influenced or only insignificantly so.

What is claimed is:

1. An insulated electrical conductor comprising an electrically conducting material in combination with an electrically insulating polyolefin composition containing in a homogeneous distribution 0.1 to 4 percent by weight, relative to the total weight of the composition, of an inorganic oxide additive selected from silica, aluminum oxide, aluminum oxide hydrate or aluminum silicate which is absorption-active for heavy metal ions or which binds heavy metal ions in an ion exchange, and which has a particle size of up to 50 microns or an agglomerate size of up to 100 microns, said additive acting upon said polyolefin composition to prevent the formation of water trees when said composition is dielectrically stressed by the presence of an electric field.

2. An insulated electrical conductor according to claim 1 wherein the additive is pyrogenic and/or precipitated silica.

3. An insulated electrical conductor according to claim 1 wherein the additive is an aluminum oxide or an aluminum oxide hydrate with a large active surface or an aluminum silicate.

4. An insulated electrical conductor according to claim 2 wherein the additive is prepared synthetically.

5. An insulated electrical conductor according to claim 1 wherein the content of the additive is about 0.5 to 2 percent by weight.

6. An insulated electrical conductor according to claim 1 wherein the particle size of the additive is up to 20 um.

7. An insulated electrical conductor according to claim 3 wherein the additive is prepared synthetically.

* * * * *